United States Patent
Spradling et al.

(10) Patent No.: US 11,173,398 B2
(45) Date of Patent: Nov. 16, 2021

(54) VIRTUAL CAMERA PLACEMENT SYSTEM

(71) Applicant: Microsoft Technology Licensing, LLC, Redmond, WA (US)

(72) Inventors: Jeffrey Brooks Spradling, Seattle, WA (US); Kyle Matthew Emtman, Kenmore, WA (US); Andrew David Beaudoin, Carnation, WA (US); Timothy Craig Dean, Sammamish, WA (US); Huw David Bowles, Brighton (GB); Stephen James Malpass, Redhill (GB); William Myles, Brighton (GB); Martin Stoykov Mihov, Hove (GB); Phillip Williams, Eastbourne (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 16/024,597

(22) Filed: Jun. 29, 2018

(65) Prior Publication Data
US 2019/0351325 A1  Nov. 21, 2019

Related U.S. Application Data

(60) Provisional application No. 62/674,590, filed on May 21, 2018.

(51) Int. Cl.
*A63F 13/5258* (2014.01)
*A63F 13/5375* (2014.01)
*A63F 13/803* (2014.01)

(52) U.S. Cl.
CPC ...... *A63F 13/5258* (2014.09); *A63F 13/5375* (2014.09); *A63F 13/803* (2014.09); *A63F 2300/634* (2013.01)

(58) Field of Classification Search
CPC . A63F 13/5258; A63F 13/5375; A63F 13/803
See application file for complete search history.

(56) References Cited

U.S. PATENT DOCUMENTS

| 7,953,521 B2 | 5/2011 | Tipping et al. |
| 8,231,468 B2 | 7/2012 | Kouno |
| (Continued) | | |

OTHER PUBLICATIONS

Glasser, et al., "AI in Computer Games: From the Player's Goal to AI's Role", In Technical Report TR-UNL-CSE-2004-0004, Mar. 23, 2004, pp. 1-18.

(Continued)

*Primary Examiner* — William H McCulloch, Jr.
*Assistant Examiner* — Ankit B Doshi
(74) *Attorney, Agent, or Firm* — Alleman Hall Creasman & Tuttle LLP

(57) ABSTRACT

A virtual camera placement system is provided which includes a user input device configured to receive user input and a display device configured to display images captured by a virtual camera. The virtual camera placement system further includes non-volatile memory configured to store instructions and a processor configured to execute the instructions to generate a three-dimensional simulation including a plurality of challenge points for a user, navigate the simulation including the challenge points in response to the user input, and control the virtual camera in the simulation differently in a plurality of camera stages based on at least the user input and an outcome of navigating one or more of the challenge points.

18 Claims, 7 Drawing Sheets

(56) References Cited

U.S. PATENT DOCUMENTS

| | | | |
|---|---|---|---|
| 8,491,394 B2 | 7/2013 | Fields et al. | |
| 2002/0188361 A1* | 12/2002 | Chudley | A63F 13/12 700/92 |
| 2004/0178576 A1 | 9/2004 | Hillis et al. | |
| 2004/0219980 A1* | 11/2004 | Bassett | A63F 13/10 463/33 |
| 2007/0265087 A1* | 11/2007 | Akahori | A63F 13/422 463/37 |
| 2007/0298881 A1 | 12/2007 | Kawamura et al. | |
| 2008/0039164 A1* | 2/2008 | Shimada | A63F 13/803 463/6 |
| 2012/0157198 A1 | 6/2012 | Latta et al. | |

OTHER PUBLICATIONS

Falk, Nick, "In defence of games supporting only one input method", http://forums.toucharcade.com/showthread.php?t=68495&page=2. Published on: Oct. 1, 2010, 5 pages.

"International Search Report and Written Opinion Issued in PCT Application No. PCT/US19/030977", dated Jul. 26, 2019, 10 Pages.

\* cited by examiner

| STAGE | VIEW |
|---|---|
| 1 | Z2 ZOOM IN TO Z2/Z5 BORDER |
| 2 | Z3/Z6 BORDER ZOOM IN TO APEX |
| 2 | PULL UP AT APEX |
| 2 | Z5/Z6 BORDER ZOOM OUT TO Z3 |
| 3 | Z13 FRONT VIEW TO Z10, Z11, Z7 WHILE REORIENTING LEFT |
| 3 | OUTSIDE GRID STATIONARY WIDE SHOT |

FIG. 9

VIRTUAL CAMERA PLACEMENT SYSTEM

CROSS REFERENCE TO RELATED APPLICATIONS

This application claims priority to U.S. Provisional Application Ser. No. 62/674,590, filed May 21, 2018, the entirety of which is hereby incorporated herein by reference for all purposes.

BACKGROUND

Many video games and other virtual simulations require the user to control multiple inputs. For example, a racing game may typically include steering, acceleration, braking, and camera manipulation performed by the user. Combining multiple inputs at once can result in a complex game with an ability barrier for new users, even if only perceived. Such barriers can prevent new users from attempting a new game they would otherwise enjoy.

SUMMARY

A virtual camera placement system is provided which includes a user input device configured to receive user input and a display device configured to display images captured by a virtual camera. The virtual camera placement system further includes non-volatile memory configured to store instructions and a processor configured to execute the instructions to generate a three-dimensional simulation including a plurality of challenge points for a user, navigate the simulation including the challenge points in response to the user input, and control the virtual camera in the simulation differently in a plurality of camera stages based on at least the user input and an outcome of navigating one or more of the challenge points.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a table summarizing the example camera progression of FIG. 6.

DETAILED DESCRIPTION

When reducing the number of inputs controlled by the user by substituting artificial intelligence (AI) controls, the virtual camera providing a point of view for simulated footage for the user may be programmatically controlled via AI logic without direct user input rather than either requiring the user to self-direct the camera or providing only predetermined camera routes. In this manner, the number of inputs and the complexity of the game or simulation may be lowered while still providing an interesting or instructive view of the game or simulation. Lowering any perceived barriers may help entice new and inexperienced users to try using the simulation or game.

Figure 1:
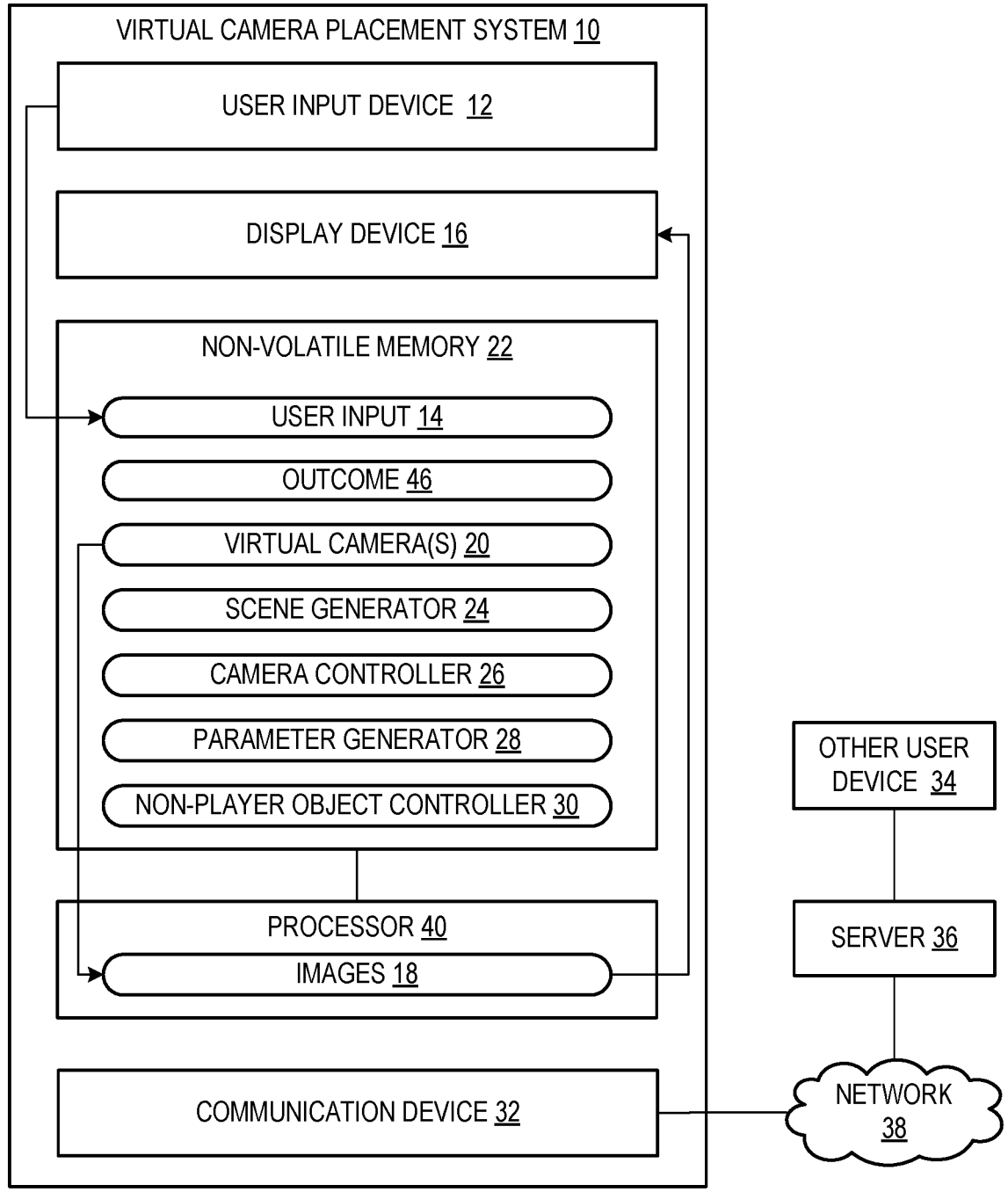
FIG. 1 shows an example of a virtual camera placement system according to an embodiment of the present description.

Accordingly, FIG. 1 shows an example of a virtual camera placement system 10 according to an embodiment of the present description. The virtual camera placement system 10 may include a user input device 12 configured to receive user input 14, a display device 16 configured to display images 18 captured by a virtual camera 20, and non-volatile memory 22 configured to store instructions. Examples of these instructions include a scene generator 24, a camera controller 26, a parameter generator 28, and a non-player object controller 30, described below. The system 10 may be a mobile computing device such as a smartphone or tablet, a larger computing device such as a desktop computer or laptop computer, or a gaming console, to provide a few examples. The display device may be a display monitor or a touch screen, for example. The user input device may be a mouse, a touch screen, an accelerometer and/or gyroscope, a handheld controller with buttons and/or joysticks, a keypad, or a keyboard, for example. The system 10 may also include a communication device 32 for communicating with another user device 34 and/or a server 36 via a network 38, for example, for updating the system 10 or allowing multiplayer or otherwise interactive contact between users.

Briefly, the system 10 may further comprise a processor 40 configured to execute the instructions to generate a three-dimensional simulation 42 including a plurality of challenge points 44 for a user, navigate the simulation 42 including the challenge points 44 in response to the user input 14, and control the virtual camera 20 in the simulation 42 differently in a plurality of camera stages based on at least the user input 14 and an outcome 46 of navigating one or more of the challenge points 44. Generation of the simulation 42 may be performed by execution of the scene generator 24 using prebuilt simulation bases stored in the non-volatile memory 22 or assembling stored simulation pieces according to instructions to create a new simulation 42. Navigation of the simulation 42, including positioning of the virtual camera 20, is described in detail below with reference to the example simulations 42 of FIGS. 2-5.

Figure 2:
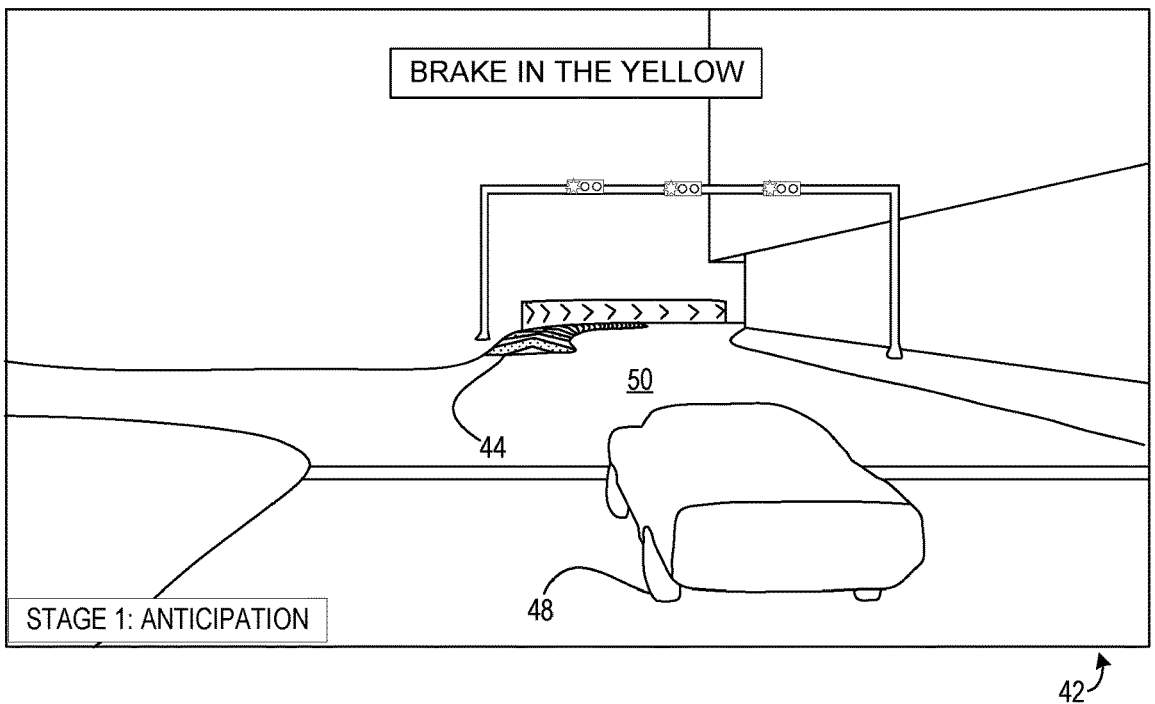
FIG. 2 shows a simulation in a first stage, generated by the system of FIG. 1.

The virtual camera 20 may be controlled in a variety of manners throughout the simulation 42 by execution of the logic of the camera controller 26. In one example, the plurality of camera stages includes a first camera progression comprising a first stage in which a broad view of an upcoming challenge point 44 is provided. Three stages are described below, but any suitable number of stages may be chosen. FIG. 2 shows a simulation 42 in the first stage, generated by the system 10 of FIG. 1. The simulation 42 may be rendered by the processor 40, which may include, for example, one or more central processing units (CPUs) and/or graphics processing units (GPUs), in order to be displayed by the display device 16. The simulation 42 may be a video game, as in the example simulations 42 provided below; however, the simulation 42 may be any three-dimensional scene rendered into two- or three-dimensional video and need not be for gaming or entertainment purposes. For example, the simulation 42 may be an interactive tour of an architectural model or existing building, or a promotional simulation of an automobile or other vehicle. In such a non-game situation, challenge points 44 may be feature points to be dramatically displayed to the user, different rooms or hallways, etc.

The video game may be, for example, a racing game, but similar principles may be applied to other types of video games such as an adventure game, a collection building game where the user moves through a scene and collects objects, or a sports game where the user uses a simple input scheme to perform various sporting feats such as route and field events, to provide merely a few examples. In FIG. 2, a user is controlling a vehicle 48 down a track or route 50 containing a plurality of challenge points 44. Here, the plurality of challenge points 4 may be curves in the route. Other challenge points 44 may include obstacles, other player characters, pits, ramps, etc.

In this example, the user is provided control over the vehicle 48 via user input 14 that is limited to a single input that is released and reinputted. The input may be a mouse button, a single gesture on a touch screen, an accelerometer and/or gyroscope gesture, a controller button, or a key, for example. The single input may control a single parameter such as speed. Thus, when the user input 14 is entered (e.g., a touch is received and held on the touch screen), the vehicle 48 accelerates. When the user input 14 is released (e.g., the touch is released), the vehicle 48 brakes or naturally decelerates, based on the point of the route 50 where the vehicle 48 currently is. That is, while the system 10 may be set to interpret releasing of the user input 14 as releasing the accelerator pedal at all times, the system 10 may instead interpret the releasing as braking in certain predefined areas of the simulation 42, such as within a preset distance of a braking phase described below, and as releasing the accelerator elsewhere. At the start line, holding the input may rev the engine while releasing the input allows the engine to slow its speed, even though the vehicle 48 is not yet moving.

The instructions (e.g., parameter generator 28) may include artificial intelligence (AI) logic executable by the processor 40 to control steering based on at least the speed and the route 50 of the simulation 42. Non-user input parameters such as steering may be generated based on factors such as current, previous, and upcoming route 50 topography; degree of success at navigating the challenge points 44; and current speed; sensitivity settings, etc. The AI logic may be configured to select the most appropriate value (e.g., a directional vector) for steering from a plurality of possible values by ranking the possible values, deprioritizing or disallowing one or more values based on the above factors failing to reach stored thresholds related to each factor, and adjusting the ranking over time in response to learned behavior of the user, aggregated behavior data of other users collected by the server 36, and/or feedback from the user or other users relating to difficulty or enjoyment of the simulation 42.

Accordingly, the user may be enabled to complete a race by only providing input on the speed of the vehicle 48, despite the route 50 containing a number of challenge points 44 such as curves. For example, the parameter generator 28 may determine that the user has a current speed that is too high to safely navigate an upcoming curve as the challenge point 44, thus failing the known threshold stored in the non-volatile memory 22 or the server 36. In response, the parameter generator 28 may direct the vehicle 48 to an outer lane around the curve, and may additionally notify the user that their speed is out of control, if the speed is greater than a first threshold. If the speed is greater than a second threshold, for example, the vehicle 48 may spin out around the curve. As an additional feature, the user may be able to use a "boost" by providing input at specific times or locations. For example, regular acceleration may be performed by touch input or mouse clicking over the vehicle 48, while a boost may be inputted at another location on the display device 16 via the same type of input. Further, a single type of input may be provided, or very few types of separate input (e.g., two or three types) may be provided as user input 14 instead in some cases.

The user's interaction with the challenge points 44 may be broken up into a plurality of stages, as mentioned above. Here, the three stages are a preview stage referred to herein as "Anticipation" that affords the user a view of an upcoming challenge point, a detail view stage referred to herein as "Interaction" that affords the user a close-in view of the user's interaction with the challenge point, and a results stage referred to herein as "Payoff" that affords the user a view that shows the user the results of the user's interaction with the challenge point. In each of these stages, the virtual camera providing the point of view for the rendered video (i.e., a series of images 18) may be programmatically switched using the AI logic of the camera controller 26 based on which stage is entered, how fast the vehicle 48 is traveling, the topography of the particular route 50, how well the user completes the challenge points 44, etc. FIG. 2 illustrates Stage 1, Anticipation. In Anticipation, the user is given a clear and broad view of the upcoming challenge point 44 for a sufficient length of time to judge the current speed, provide speed adjustments, and time the encounter with the challenge point 44 and the vehicle 48. A clear and broad view may be achieved by a virtual camera placement tied to the vehicle 48 position, relatively straight on the route 50, and relatively elevated for a clear view of the challenge point 44 and the location of the vehicle 48. However, this is merely an example and the camera controller 26 may be configured to programmatically choose the camera position using AI logic based on the above-mentioned factors in real-time such that each playthrough of an identical route may result in a different sequence of camera views.

Figure 3:
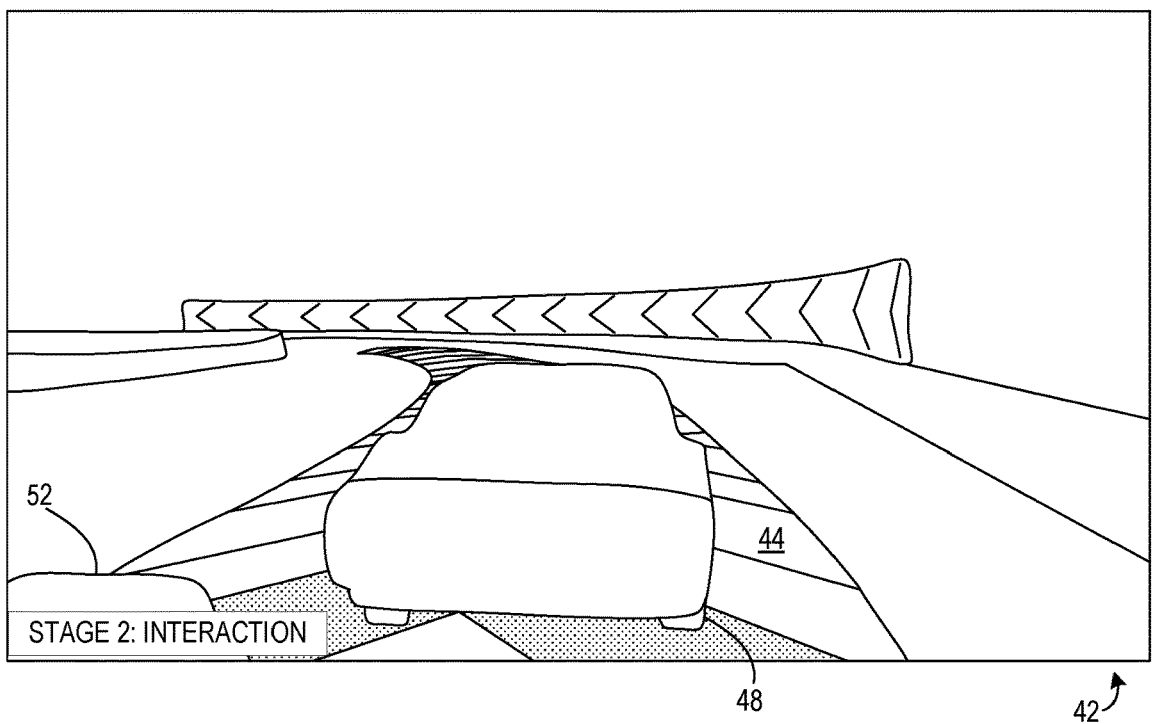
FIG. 3 shows the simulation in a second stage.

In FIG. 2, the user is prompted to brake, that is, release the user input 14, upon reaching the portion of the curve marked with chevrons. In the Anticipation stage, the user prepares to meet the challenge point 44 by timing the release of the user input 14 that will occur in the next stage. In FIG. 3, the user has entered a second stage in which a close-up view of an interaction with the challenge point 44 is provided. In Stage 2, Interaction, the vehicle 48 is in the middle of the challenge point 44. Interaction with each challenge point 44 may include, for example, a braking phase (e.g., a first color of chevrons, illustrated as a dotted pattern), a turn phase (e.g., a second color of chevrons, illustrated as white), and an acceleration phase (e.g., after the chevrons), and the outcome 46 of the challenge point 44 may be determined by a degree of success in at least one phase. The first color of chevrons have ended and the second color of chevrons have begun, indicating that a successful turn through the curve will require braking to have already begun before the illustrated moment in FIG. 3.

In phase 1, the camera position may zoom in to reinforce the sense of braking by seeming to draw the user in toward the vehicle 48, in the case of perfectly executed braking. "Perfect braking" may include a tolerance of error, for example, ±3 in-game feet, ±10% of the length of the challenge point 44, or ±0.3 seconds. These exemplary values may be suitably adjusted to adjust the difficulty of the game. The user may brake too early instead. "Early braking," which is braking before the tolerance for "perfect braking,"

may result in not pulling the camera in at all, or else pulling in only slightly compared to in "perfect braking." "Late braking," which is braking after the tolerance for "perfect braking," may have the effect of the user driving too fast through a curve, and thus may, for example, result in the camera position swinging out wide rather than pulling in, to reinforce the feeling of careening out of control around the curve. These degrees of success for braking are provided by way of example, and may include fewer or more than three. The user's success at navigating the challenge may affect the camera positioning, but also the other simulated parameters such as steering.

In phase 2, where the vehicle 48 begins to turn, the camera position may move above to an apex position to watch the turn proceed, or may move outside in the case of late braking to show the vehicle 48 going out of control or hitting a wall, for example. Acceleration in phase 3 may be graded similarly to the braking in phase 1, where acceleration out of the curve is timed to the ending of the chevrons on the route 50, or other notification method. Once the vehicle 48 is accelerated again in phase 3, the virtual camera 20 may move back to a default ready position behind the vehicle 48 to set up for Stage 3, Payoff. In addition, the camera position zooming out may allow the user to feel as though the vehicle 48 is accelerating away from the display device 16. Accordingly, the degree of success for navigating the challenge may include both the braking and accelerating, and may additionally include the turning in between. Thus, if the user is supposed to provide or not provide any user input 14 during the turn, any mistake may be reflected in the degree of success, and thus the overall outcome 46 of navigating the challenge point 44.

Figure 4:
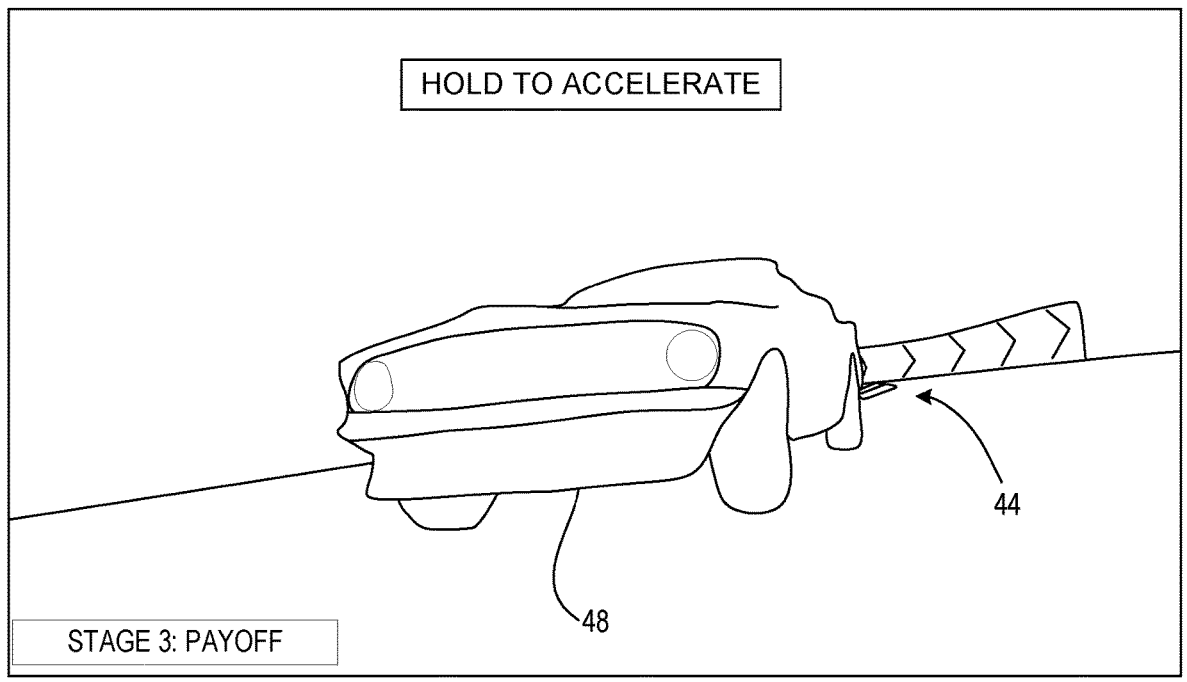
FIG. 4 shows the simulation in a third stage.
Figure 5:
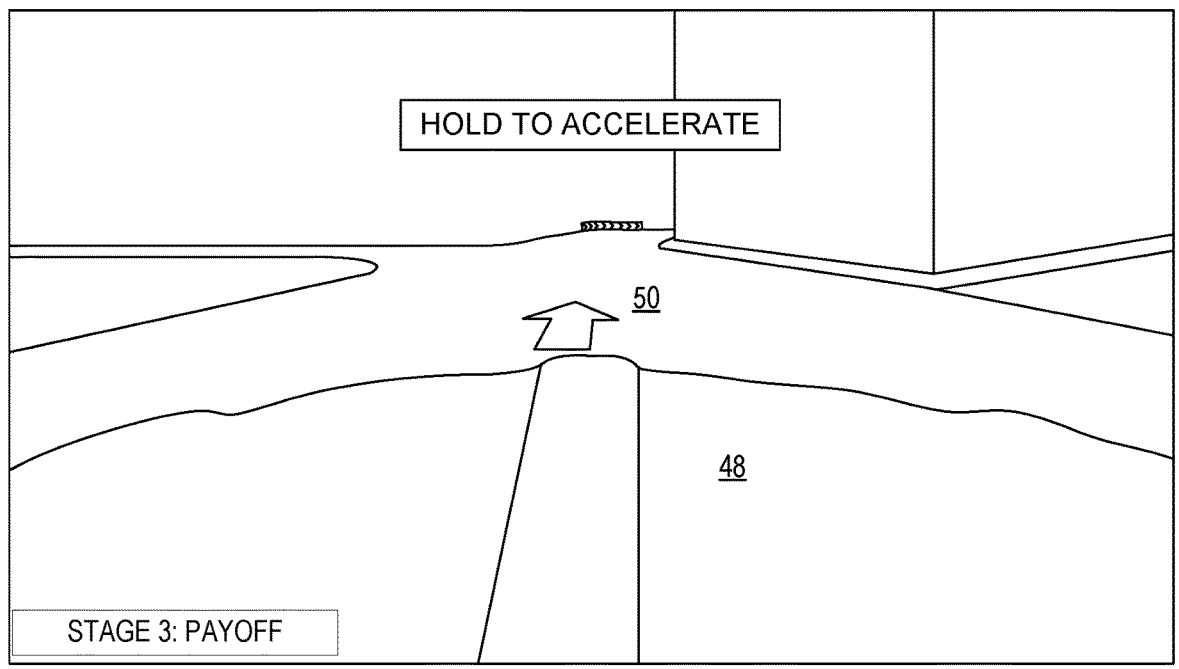
FIG. 5 shows the simulation in another view of the third stage.

FIGS. 4 and 5 show the simulation 42 in a third stage in which a cinematic view of results of the interaction is provided, Payoff. Payoff is the enjoyable moment when the user gets to revel in beating the challenge point 44, passing a computer-controlled or other player's vehicle 52 (see FIG. 3), and/or speeding away for the win. By executing the non-player object controller 30, computer-controlled vehicles may be placed on predefined routes for the route 50 or may be dynamically set in response to the navigation of the route 50 by the vehicle 48. Computer-controlled vehicles may, for example, be adjusted higher or lower in difficulty as competition for the user.

To augment the user experience of Payoff, cinematic camera pans, aerial "helicopter shots," and other views reminiscent of an action movie are presented. One scene may be used, or a plurality may be included, as shown in FIGS. 4 and 5. In some cases, the third stage may further include a cinematic replay of part of the second stage, for example, if the passing occurred during the turn rather than while accelerating away. The views may be chosen to show off the aesthetically pleasing racecar, as in the front perspective view of FIG. 4 or the hood view shown in FIG. 5. In addition, the views may depend on the proximity of the vehicle 48 to other vehicles 52. The navigation of the simulation 42 may be marked by an object representing the user, in this case, the vehicle 48. In other cases, the object may be an avatar or other marker. When the outcome 46 includes the object of the user passing an object of another user or a computer-controlled object, in this case, the other vehicle 52, the third stage may further include a view highlighting the passing. Thus, in the example of a racing game, if another car is passed, the best view to highlight this moment will be programmatically chosen by the AI logic of the camera controller 26. Camera positions that would clip (i.e., collide with or be positioned inside the mesh of another object) as the vehicle 48 moves would be deprioritized or excluded in a ranking of potential camera positions, and the virtual cameras 20 may include avoidance logic so as to not collide with any vehicle 48 or stationary object and thus obscure the view for the user. Camera positions that show only the vehicle 48 or the other vehicle 52 being passed, but not both, may be deprioritized, for example. As the distance between the two vehicles changes, the virtual camera 20 used may also change accordingly. Factors in ranking and choosing camera positions are not particularly limited as many combinations of factors may be used. User feedback may be taken into account that certain shots are good or bad, and those camera positions and movements may be deprioritized in the future.

Figure 6:
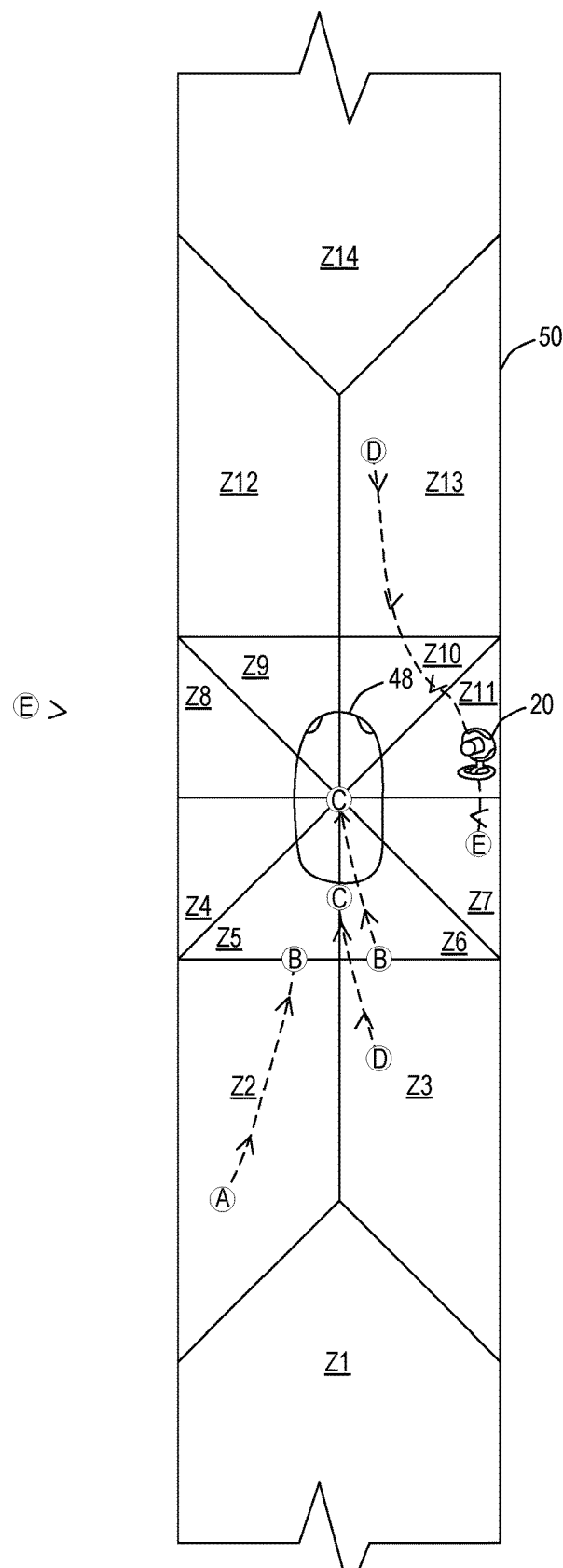
FIG. 6 shows a camera positioning grid and example camera progression for generating the simulation.

FIG. 6 shows an exemplary camera positioning grid for the simulation 42 during Stage 3. The route 50 is divided into 14 zones, Z1-14, which are merely provided as an example. The vehicle 48 is placed in the center of the grid. Zones Z1 and Z14 are distant zones for rear and front wide shots, respectively, and zones Z2 and Z3 are left and right rear zones, while Z12 and Z13 are left and right front zones, for midrange shots. Further, zones Z4-Z11 are close zones around the vehicle 48.

As shown, a virtual camera 20 is currently positioned in zone Z11 to render footage of the vehicle 48 during Payoff. Each zone may have multiple cameras 20 ready to be switched to during Payoff depending on multiple factors, as discussed above, as opposed to preset cinematic scenes always played at various points in the race or in response to common triggers such as spinning out. For example, zone Z11 may include a virtual camera 20 for a "helicopter shot," a virtual camera 20 facing rearward toward the vehicle 48, and a virtual camera 20 facing the side of the vehicle 48. One "virtual camera 20" may be considered to be suddenly switching positions, or the images 18 may be considered to be captured by a plurality of "virtual cameras 20." Thus, the camera position may smoothly transition between adjacent zones or else may cut from one zone to another. The camera position in Anticipation and Interaction may be a three-dimensional position relative to the moving position of the vehicle 48. Most of the camera positions for Payoff may similarly be tied to the vehicle 48; however, some virtual cameras 20 may also be mounted at a fixed position along the route 50, or in predetermined camera routes, for Payoff.

An example camera progression is shown in dashed lines in FIG. 6 and summarized in a table in FIG. 9. The two-dimensional orientation of the virtual camera 20 is indicated by the arrows along the dashed lines in FIG. 6. This is merely one example that may be generated on the fly in response to the user's success at playing the game, topographical features of the route 50, and the activity of other vehicles 52, etc. It will be appreciated that myriad other possibilities exist and the virtual camera 20 is not limited to only one progression. Further, because the progression may be generated on the fly, the best view to train the user in the gameplay, inform the user of the location of challenge points 44, and show off the features of the game such as fancy sports cars may be compiled into a camera progression, rather than utilizing stock footage of preset scenes that are played each time a corresponding trigger occurs.

In this example, starting at point A, at Anticipation, the virtual camera 20 may move within zone Z2 toward a good vantage point to see both the upcoming challenge point 44 and a portion of the vehicle to judge the timing of the upcoming brake command. At B, the virtual camera 20 may switch to zone Z6 due to the curvature of the route 50, surrounding scenery, or another vehicle 52, for example. Here, the example user has achieved "Perfect Braking" and thus the camera 20 pulls in on the vehicle 48 from B to C, to simulate the effect of braking a real vehicle. At C, the camera may be directed downward toward the vehicle 48 and move upward to provide an apex view of the vehicle 48 turning around the curve. After C, the camera 20 may move position and pull away from the vehicle toward D in zone Z3, while maintaining a forward orientation, thus simulating the effect of accelerating a real vehicle. At D, for Payoff, the camera 20 may switch to a front view of the vehicle 48 from zone Z13 which smoothly moves through zones Z10, Z11, and Z7 while simultaneously adjusting orientation to a side shot at E. From E, the virtual camera 20 may move to a wide shot off the route 50 for a stationary view as the vehicle moves past the camera 20. As discussed above, various views may be used in Payoff to create a cinematic progression, including helicopter shots, pans of a stadium of fans at the finish line, close-up side views, etc. Once Payoff ends, a new progression may begin, preparing for Anticipation.

Figure 7:
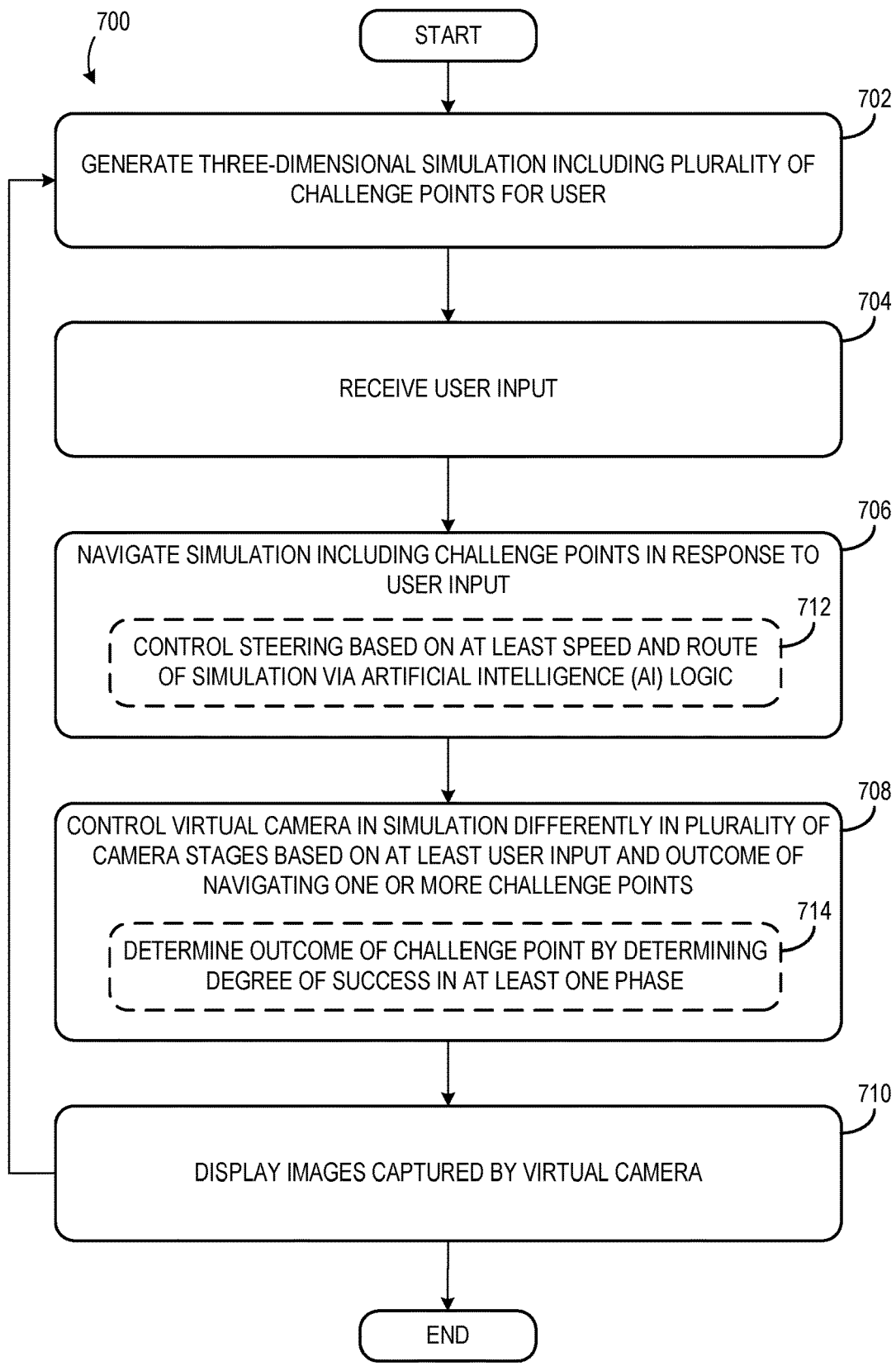
FIG. 7 shows a flowchart of a virtual camera placement method.

FIG. 7 shows a flowchart of a virtual camera placement method 700. The following description of method 700 is provided with reference to the virtual camera placement system described above and shown in FIG. 1. It will be appreciated that method 700 may also be performed in other contexts using other suitable components.

With reference to FIG. 7, at 702, the method 700 may include generating a three-dimensional simulation including a plurality of challenge points for a user. The simulation may be a video game such as a racing game. In a racing game, the plurality of challenge points may be curves in a route, or they may be obstacles, holes, changes in direction or elevation, etc. Alternatively, the simulation may be for a purpose other than gaming or entertainment, such as displaying a modeled work or virtually touring an environment.

At 704, the method 700 may include receiving user input. At 706, the method 700 may include navigating the simulation including the challenge points in response to the user input. In some cases, the user input may be limited to a single input that is released and reinputted, such as a mouse click, touch screen tap/hold, or key press. With this configuration, the single input may control a speed, and at 712, the method 700 may include controlling steering based on at least the speed and a route of the simulation via artificial intelligence (AI) logic. As discussed above, AI logic may involve comparing input and current status to preset thresholds, ranking possible courses of action, choosing a highest or highly ranked action, and incorporating feedback to finetune future rankings.

At 708, the method 700 may include controlling a virtual camera in the simulation differently in a plurality of camera stages based on at least the user input and an outcome of navigating one or more of the challenge points. The plurality of camera stages may include a first camera progression comprising, for example, a first stage (e.g., Anticipation discussed above) in which a broad view of an upcoming challenge point is provided, a second stage (e.g., Interaction discussed above) in which a close-up view of an interaction with the challenge point is provided, and a third stage (e.g., Payoff discussed above) in which a cinematic view of results of the interaction is provided. The third stage may further include a cinematic replay of part of the second stage, for instance. The first camera progression may include a single or multiple views per stage, and other suitable camera progressions may be utilized at points other than challenge points of the simulation.

In one example, each challenge point includes a braking phase, a turn phase, and an acceleration phase. In this example, at 714, the method 700 may include determining the outcome of the challenge point by determining a degree of success in at least one phase. The degree of success may be, for example, a comparison of a preset definition of success such as a timepoint or distance at which the user input should be received, with data of the actually received user input. As discussed above, one example includes a rating of the braking timing and a rating of the acceleration timing. However, the degree of success may be determined at one, some, or all phases.

Finally, at 710, the method 700 may include displaying images captured by the virtual camera, for example, as video output on a display device. It will be appreciated that the method 700 may be an iterative process as long as the simulation or game continues, where user input is received to navigate the simulation, the virtual camera is controlled differently in various camera stages, images/video is displayed, and the AI logic responsible for generating the simulation, controlling movable objects, and controlling the virtual cameras may learn from history or outside sources via the server.

As described above, it will be appreciated that Anticipation, Interaction, and Payoff are three terms for different camera stages or modes of the system described herein. In each of these modes the camera is programmatically moved as the user navigates the environment, according to different programming logic that is designed to accomplish a goal of the respective mode, typically in response to minimal user input and performance by the user. A goal of the Anticipation mode is to provide the user with a sufficient view to prepare for the upcoming challenge in the game. Over successive plays, the user will be conditioned to expect and prepare for an upcoming challenge when the camera begins to behave according to the Anticipation mode. A goal of the Interaction mode is to provide the user with a sufficiently close view of the user's interaction with the driven vehicle, to enable the user to gain direct feedback for whether they have properly provided user input to successfully navigate the challenge, or if not, how their inputs would result in less than optimal navigation of the challenge. Finally, the Payoff mode provides the user with a time to once again view their navigation of the challenge from an optimal camera angle to see the entire challenge unfold, including interactions with other vehicles, obstacles, fans, etc. Accordingly, even when the difficulty and complexity are both lowered to remove an ability barrier for new and low-interest users, these modes together establish a rhythm to the experience, enabling the user to prepare for, execute, and re-live successive challenges in the environment, and retain the user's interest in the simulation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
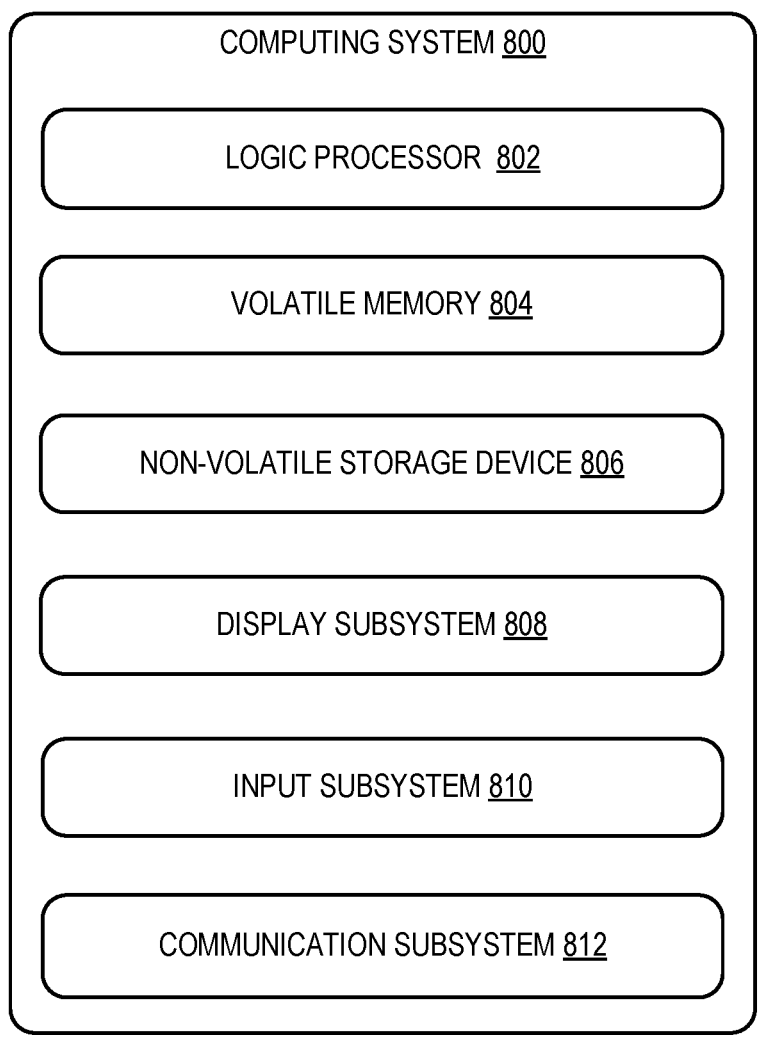
FIG. 8 shows an example computing system according to an embodiment of the present description.

FIG. 8 schematically shows a non-limiting embodiment of a computing system 800 that can enact one or more of the methods and processes described above. Computing system 800 is shown in simplified form. Computing system 800 may embody the virtual camera positioning system 10 described above and illustrated in FIG. 1. Computing system 800 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 610, communication subsystem 612, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include non-volatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FP GAs), program- and application-specific integrated circuits (PASIC/ASICs), program- and application-specific standard products (PSSP/ASSPs), system-on-a-chip (SOC), and complex programmable logic devices (CPLDs), for example.

The term "instructions" may be used to describe an aspect of computing system 800 typically implemented in software by a processor to perform a particular function using portions of volatile memory, which function involves transformative processing that specially configures the processor to perform the function. Thus, instructions may be instantiated via logic processor 802 executing the instructions held by non-volatile storage device 806, using portions of volatile memory 804. It will be understood that different instructions may be instantiated from the same application, service, code block, object, library, routine, API, function, etc. Likewise, the instructions may be instantiated by different applications, services, code blocks, objects, routines, APIs, functions, etc. The term "instructions" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a virtual camera placement system, comprising a user input device configured to receive user input, a display device configured to display images captured by a virtual camera, non-volatile memory configured to store instructions, and a processor configured to execute the instructions to generate a three-dimensional simulation including a plurality of challenge points for a user, navigate the simulation including the challenge points in response to the user input, and control the virtual camera in the simulation differently in a plurality of camera stages based on at least the user input and an outcome of navigating one or more of the challenge points. In this aspect, additionally or alternatively, the plurality of camera stages may include a first camera progression comprising a first stage in which a broad view of an upcoming challenge point is provided, a second stage in which a close-up view of an interaction with the challenge point is provided, and a third stage in which a cinematic view of results of the interaction is provided. In this aspect, additionally or alternatively, the third stage may further include a cinematic replay of part of the second stage. In this aspect, additionally or alternatively, the navigation of the simulation may be marked by an object representing the user, and when the outcome includes the object of the user passing an object of another user or a computer-controlled object, the third stage may further include a view highlighting the passing. In this aspect, additionally or alternatively, the user input may be limited to a single input that is released and reinputted. In this aspect, additionally or alternatively, the single input may control a speed, and the instructions may include artificial intelligence (AI) logic executable by the processor to control steering based on at least the speed and a route of the simulation. In this aspect, additionally or alternatively, the simulation may be a video game. In this aspect, additionally or alternatively, the video game may be a racing game. In this aspect, additionally or alternatively, the plurality of challenge points may be curves in a route. In this aspect, additionally or alternatively, each challenge point may include a braking phase, a turn phase, and an acceleration phase, and the outcome of the challenge point may be determined by a degree of success in at least one phase.

Another aspect provides a virtual camera placement method. The method may comprise generating a three-dimensional simulation including a plurality of challenge points for a user, receiving user input, navigating the simulation including the challenge points in response to the user input, and controlling a virtual camera in the simulation differently in a plurality of camera stages based on at least the user input and an outcome of navigating one or more of the challenge points, and displaying images captured by the virtual camera. In this aspect, additionally or alternatively, the plurality of camera stages may include a first camera progression comprising a first stage in which a broad view of an upcoming challenge point is provided, a second stage in which a close-up view of an interaction with the challenge point is provided, and a third stage in which a cinematic view of results of the interaction is provided. In this aspect, additionally or alternatively, the third stage may further include a cinematic replay of part of the second stage. In this aspect, additionally or alternatively, the user input may be limited to a single input that is released and reinputted. In this aspect, additionally or alternatively, the single input may control a speed, and the method may further include controlling steering based on at least the speed and a route of the simulation via artificial intelligence (AI) logic. In this aspect, additionally or alternatively, the simulation may be a video game. In this aspect, additionally or alternatively, the video game may be a racing game. In this aspect, additionally or alternatively, the plurality of challenge points may be curves in a route. In this aspect, additionally or alternatively, each challenge point may include a braking phase, a turn phase, and an acceleration phase, and the method may further include determining the outcome of the challenge point by determining a degree of success in at least one phase.

Another aspect provides a virtual camera placement system for a racing video game. The system may comprise a user input device configured to receive a single input that is released and reinputted as user input, a display device configured to display images captured by a virtual camera, non-volatile memory configured to store instructions, and a processor configured to execute the instructions to generate a three-dimensional simulation including a plurality of challenge points for a user, navigate the simulation including the challenge points in response to the user input, and control the virtual camera in the simulation differently in a plurality of camera stages based on at least the user input and an outcome of navigating one or more of the challenge points. The plurality of camera stages may include a first camera progression comprising a first stage in which a broad view of an upcoming challenge point is provided, a second stage in which a close-up view of an interaction with the challenge point is provided, and a third stage in which a cinematic view of results of the interaction is provided.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A virtual camera placement system, comprising:
 a user input device configured to receive user input including a single input that is released and reinputted;
 a display device configured to display images captured by a virtual camera;
 non-volatile memory configured to store instructions including artificial intelligence (AI) logic; and
 a processor configured to execute the instructions to:
  generate a simulation including a plurality of challenge points for a user, the simulation being three dimensional;
  navigate the simulation including the plurality of challenge points in response to the user input;
  control a speed of an object representing the user in response to the single input;
  control steering of the object by the AI logic, based on at least the speed and a route of the simulation and without receiving user steering input; and
  control the virtual camera in the simulation differently in a plurality of camera stages based on at least the user input and an outcome of navigating one or more of the plurality of challenge points, wherein the plurality of camera stages includes a first camera progression comprising:
   a first stage in which a broad view of an upcoming first challenge point is provided;

a second stage in which a close-up view of an interaction with the first challenge point is provided; and a third stage in which a cinematic view of results of the interaction is provided.

2. The virtual camera placement system of claim 1, wherein the third stage further includes a cinematic replay of part of the second stage.

3. The virtual camera placement system of claim 1, wherein when the outcome includes the object representing the user passing an object of another user or a computer-controlled object, the third stage further includes a view highlighting the passing.

4. The virtual camera placement system of claim 1, wherein the simulation is a video game.

5. The virtual camera placement system of claim 4, wherein the video game is a racing game.

6. The virtual camera placement system of claim 5, wherein the plurality of challenge points are curves in a route.

7. The virtual camera placement system of claim 6, wherein each challenge point includes a braking phase, a turn phase, and an acceleration phase, and for each challenge point, the outcome is determined by a degree of success in at least one phase.

8. A virtual camera placement method, comprising:
generating a simulation including a plurality of challenge points for a user, the simulation being three dimensional;
receiving user input;
navigating the simulation including the plurality of challenge points in response to the user input;
controlling a virtual camera in the simulation differently in a plurality of camera stages based on at least the user input and an outcome of navigating one or more of the plurality of challenge points, wherein the virtual camera is positioned in a different manner based on which camera stage the simulation is in; and
displaying images captured by the virtual camera, wherein the plurality of camera stages includes a first camera progression comprising:
a first stage in which a broad view of an upcoming first challenge point is provided;
a second stage in which a close-up view of an interaction with the first challenge point is provided; and
a third stage in which a cinematic view of results of the interaction is provided.

9. The virtual camera placement method of claim 8, wherein the third stage further includes a cinematic replay of part of the second stage.

10. The virtual camera placement method of claim 8, wherein the user input is limited to a single input that is released and reinputted.

11. The virtual camera placement method of claim 10, wherein
the single input controls a speed; and
the method further includes controlling steering based on at least the speed and a route of the simulation via artificial intelligence (AI) logic.

12. The virtual camera placement method of claim 8, wherein the simulation is a video game.

13. The virtual camera placement method of claim 12, wherein the video game is a racing game.

14. The virtual camera placement method of claim 13, wherein the plurality of challenge points are curves in a route.

15. The virtual camera placement method of claim 14, wherein
each challenge point includes a braking phase, a turn phase, and an acceleration phase; and
the method further includes, for each challenge point, determining the outcome by determining a degree of success in at least one phase.

16. A virtual camera placement system for a racing video game, comprising:
a user input device configured to receive a single input that is released and reinputted as user input;
a display device configured to display images captured by a virtual camera;
non-volatile memory configured to store instructions including artificial intelligence (AI) logic; and
a processor configured to execute the instructions to:
generate a simulation including a plurality of challenge points for a user, the simulation being three dimensional;
navigate the simulation including the plurality of challenge points in response to the user input;
control a speed of an object representing the user in response to the single input;
control steering of the object by the AI logic, based on at least the speed and a route of the simulation and without receiving user steering input; and
control the virtual camera in the simulation differently in a plurality of camera stages based on at least the user input and an outcome of navigating one or more of the plurality of challenge points, the virtual camera being positioned in a different manner based on which camera stage the simulation is in, the plurality of camera stages including a first camera progression comprising:
a first stage in which a broad view of an upcoming first challenge point is provided;
a second stage in which a close-up view of an interaction with the first challenge point is provided; and
a third stage in which a cinematic view of results of the interaction is provided.

17. The virtual camera placement system of claim 16, wherein each challenge point includes a braking phase, a turn phase, and an acceleration phase, and for each challenge point, the outcome is determined by a degree of success in at least one phase.

18. The virtual camera placement system of claim 16, wherein the plurality of challenge points are curves in a route.

* * * * *